United States Patent [19]

Olsson et al.

[11] 4,180,549

[45] Dec. 25, 1979

[54] DESULFURIZATION OF HOT REDUCING GAS

[75] Inventors: Robert G. Olsson, Edgewood Borough; Ethem T. Turkdogan, Pittsburgh, both of Pa.

[73] Assignee: United States Steel Corporation, Pittsburgh, Pa.

[21] Appl. No.: 718,257

[22] Filed: Aug. 27, 1976

[51] Int. Cl.² .......................................... B01D 53/34
[52] U.S. Cl. .................................. 423/230; 423/542; 252/471
[58] Field of Search ............... 423/230, 224, 599, 542; 252/471, 463

[56] References Cited

U.S. PATENT DOCUMENTS

| 2,824,047 | 2/1958 | Gorin et al. | 201/17 |
| 3,635,695 | 1/1972 | Chu | 252/471 |

FOREIGN PATENT DOCUMENTS

| 658452 | 2/1963 | Canada | 423/230 |
| 7213643 | 4/1973 | Netherlands | 423/230 |
| 719056 | 11/1954 | United Kingdom | 423/230 |
| 902140 | 7/1962 | United Kingdom | 423/230 |

OTHER PUBLICATIONS

Buchukuri et al., Manganese Ores in Removal of Sulfur Compounds, Bulletin of the Academy of Sciences of the Georgian SSR, vol. 62, No. 2, 1971.

Primary Examiner—O. R. Vertiz
Assistant Examiner—Thomas W. Roy
Attorney, Agent, or Firm—W. Gary Goodson

[57] ABSTRACT

Hot reducing gas is desulfurized by contacting the gas with a desulfurizing agent comprising a bed of porous manganese oxide pellets, then regenerating the spent desulfurizing agent by contacting the bed with a gaseous oxidizing atmosphere and then reusing the regenerated desulfurizing agent under the above mentioned conditions for desulfurizing hot reducing gas. The temperature of the bed of pellets is between about 500° C. and about 1300° C. during both the desulfurization and the regeneration steps.

23 Claims, 4 Drawing Figures

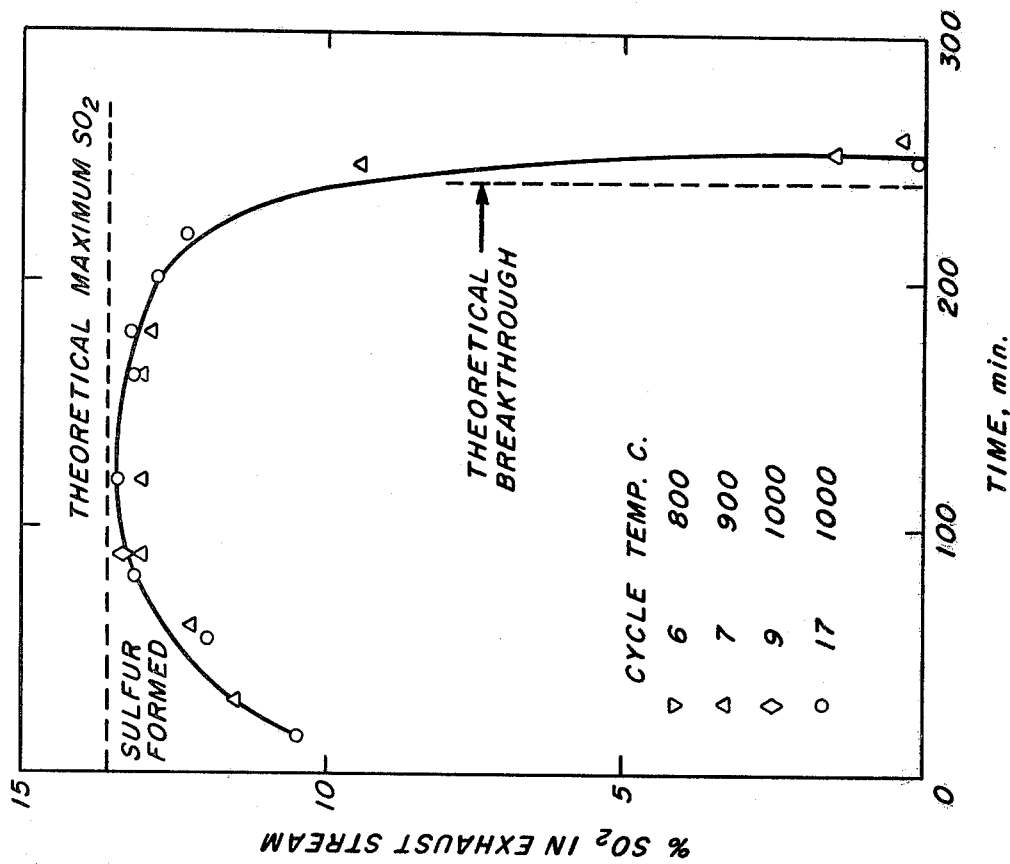
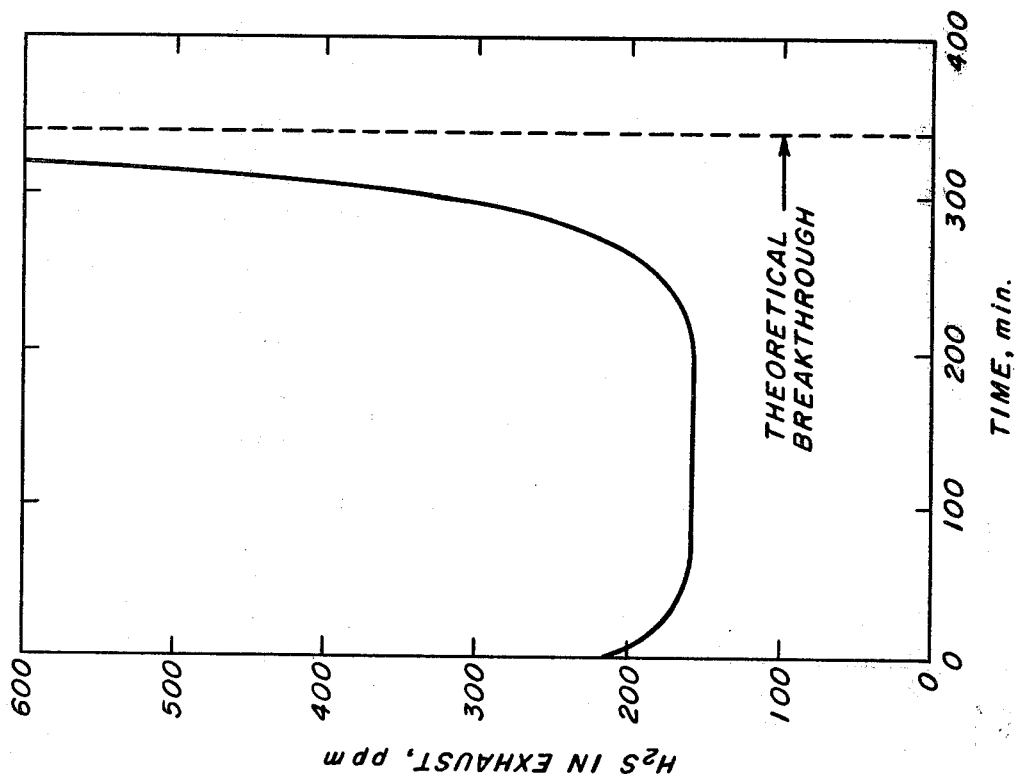

DESULFURIZATION OF HOT REDUCING GAS

BACKGROUND OF THE INVENTION

Desulfurization of hot fuel gas is currently the subject of extensive research, primarily because it could lead to thermally efficient power generation in coal-based, combined-cycle systems. Hot-gas desulfurization also has advantages for coal-based direct reduction of iron ore. The use of calcined dolomite has been suggested for desulfurization of hot reducing gases (cf. U.S. Pat. Nos. 3,276,203, 3,307,350 and 3,853,538). While dolomite is an effective gas-desulfurizing agent, the most commonly proposed method of regenerating dolomite, reacting with $CO_2$ and $H_2O$ under slightly reducing conditions at pressures greater than about 50 psig and temperatures preferably about 1000°-1200° F. to liberate $H_2S$, does not achieve complete regeneration of the dolomite. Furthermore, continuous use of dolomite for gas desulfurization followed by regeneration results in successively less efficient regeneration until, after about 10 cycles, the dolomite has only about 10 to 20 percent of its original desulfurizing capacity remaining. Furthermore, because the spent dolomite contains appreciable non-regenerated calcium sulfide, it must undergo expensive and complex treatment to bring it to a state suitable for disposal without causing pollution of the air and groundwater. When dolomite is calcined after having been regenerated by the above suggested process, some of the residual sulfur in the dolomite can be released, which requires difficult treatment to bring the stack gas to a condition suitable for venting to the atmosphere.

The use of manganese carbonate and oxide ores have been suggested and tried in high temperature removal of sulfur compounds from coke gas. See. N.Y. Buchukuri et al., "The Use of Manganese Carbonate and Oxide Ores in High Temperature Removal of Sulfur Compounds from Coke Gas", Bulletin of Academy of Sciences of the Georgian SSR, Vol. 62, No. 2, 1971. However, the system was not believed to be practical due to the slow rate of reaction as well as the incomplete reaction observed between manganese oxide ore and hot reducing gases containing $H_2S$.

SUMMARY OF THE INVENTION AND BRIEF DESCRIPTION OF THE DRAWINGS

This invention relates to an improved process for desulfurizing hot reducing gas by contacting the gas with a desulfurizing agent, then regenerating the spent desulfurizing agent, and then reusing the regenerated desulfurizing agent for desulfurizing hot reducing gases as just outlined. The improvement relates to the use of a bed of porous pellets comprising manganese oxide as the desulfurizing agent and regenerating the spent desulfurizing agent by contacting the bed of pellets with an oxidizing gaseous atmosphere. The temperature of the bed is maintained between about 500° C. and about 1300° C. in both the desulfurization and regeneration steps. Preferably, the pellets comprise sintered finally divided manganese oxide particles and have a diameter between about 5 and about 15 mm. More preferably the pellets comprise a reaction product of an intimate mixture of finely divided manganese oxide and a nonreactive finely divided porous metal oxide. Preferably the regenerated pellets are reduced to MnO in a separate step by contacting the bed of pellets with a desulfurized hot reducing gas. The regenerated, reduced bed of pellets are then reused for desulfurizing hot reducing gas in the manner described above. The invention also includes the process of reducing ore by contacting the ore with reducing gases produced by the method described above. Preferably the ore is iron ore. Also the invention described above includes the production of clean reducing gas for use in power generation. Furthermore, the invention includes apparatus for carrying out the above mentioned processes.

Applicants' process using a bed of porous manganese oxide pellets has the advantage that a bed of pellets can be regenerated and used many times without significant loss of reactivity. Furthermore, the above mentioned pellets will not deteriorate after repeated use. This is especially true of the sintered pellets which are a reaction product of finely divided manganese oxide and finely divided nonreactive metal oxide. Additionally, applicants find that by this invention provides more temperature flexibility compared to the dolomite system described above as illustrated by the applicability of lower input temperatures and higher output temperatures. Additionally, the manganese oxide pellets in this invention provide much easier handling than the dolomite pellets of the prior art since the manganese oxide pellets will not weather even in rain whereas calcined dolomite picks up water. Also, the manganese sulfide pellets produced as a result of desulfurizing hot reducing gas can be stored in the outdoors in open piles with no hydrogen sulfide gas coming off. This is not true of sulfided dolomite. Thus applicants' invention overcomes serious air and water pollution problems.

The further advantage of the process of this invention is that in the regeneration of a bed of pellets the product gas is $SO_2$. This $SO_2$ product can be of any desired purity depending upon the nature of the oxidizing atmosphere utilized. The fact that this $SO_2$ is a salable product is a decided advantage. The dolomite regeneration process does not produce an immediately salable product. Finally if a bed of pellets of applicants' invention should need to be disposed of due to buildup of fly ash or such problems the manganese can readily be recovered from the pellets and therefore reduce the overall cost of the process.

FIGS. 2–4 are graphs showing some of the results of the examples.

DESCRIPTION OF THE PREFERRED EMBODIMENT(S)

Figure 1:
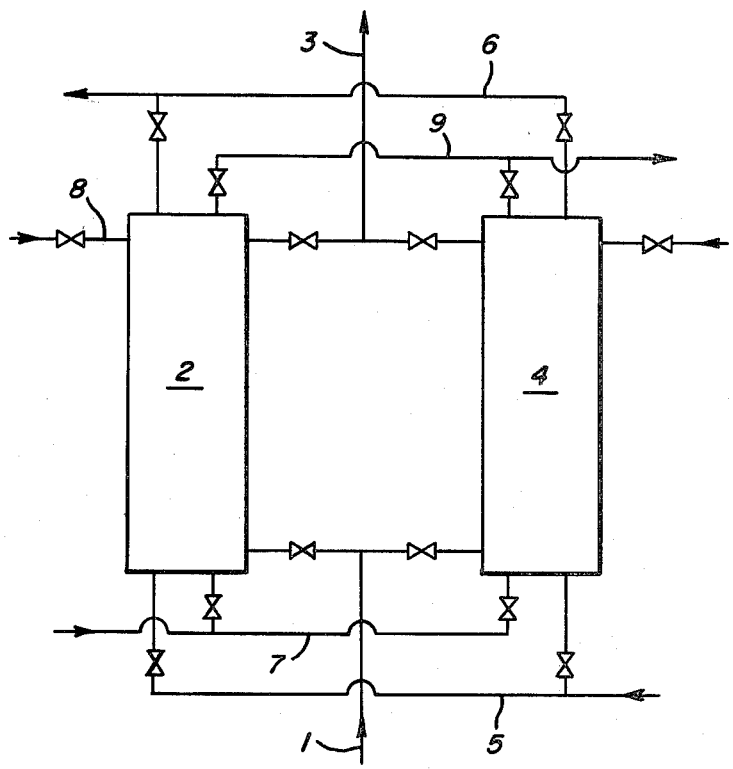
FIG. 1 is a schematic diagram of one embodiment of hot reducing gas desulfurization process and apparatus of this invention.

The term pellet as used herein is intended to define any particle having a diameter of at least about 5 mm. These pellets comprise manganese oxide and have sufficient strength to withstand pressure in a packed bed of pellets used for desulfurizing hot reducing gases under conditions of the process of this invention. Preferably a bed of pellets is a fixed or moving packed bed, and preferably has a diameter of between about 1 and about 20 feet and a height of between about 1 and about 30 feet. In a preferred process of this invention two or more packed beds are used together to carry out the process. In a simple embodiment comprising two packed beds, one bed can be used for desulfurization of hot reducing gases according to the process described above and the second bed can simultaneously be used to regenerate spent pellets previously used for desulfurization. Desulfurization under the conditions described above generally takes place in a matter of a few seconds and regeneration takes place in a matter of a few seconds. However, by way of example, a fixed, packed bed of pellets having a diameter of 10 inches and a height of 10 ft and wherein the pellets have an average diameter of between about 5 and about 15 mm., and are sintered reaction products of manganese oxide and aluminum oxide, can be utilized for desulfurization from about 25 to about 36 hours before the bed looses its effectiveness and the oxide is completely converted to sulfide. The regeneration of this bed under the conditions described above takes between about 18 and about 24 hours. In the preferred process just described the bed would be treated separately with a mildly reducing hot gas after the regeneration step for between about 10 minutes and about 3 hours to completely reduce the higher oxides of manganese to MnO. Without this separate reducing step there is an initial period during the desulfurization step when the sulfur content of the product gas increases significantly until the manganese oxide pellets are fully reduced to MnO.

The term "reaction product" as used herein is intended to describe the product produced by intimately mixing manganese oxide and a non-reactive porous metal oxide, and forming into a pellet and sintering by heating. Preferably this is accomplished by combining finely divided manganese oxide and finely divided nonreactive porous metal oxide and compacting this mixture into pellets of larger sizes than the finely divided materials. Preferably, the pellet is then sintered by heating to a temperature between about 1000° and about 1400° C. The pellet is porous and preferably has a porosity of at least about 10 percent by a volume of the pellet and more preferably at least about 30% by volume of the pellet. The pellet has a strength of at least about 10 pounds. The strength in a compression strength test performed by squeezing a ⅜ inch to ½ inch pellet until it cracks. The pressure at the point of cracking is the measure of strength. The porosity of the pellets is measured by the standard mercury displacement test.

The nonreactive metal oxide of this invention is preferably in the form of a finely divided particle having an average diameter of less than about 1 mm. and more preferably less than about 0.2 mm. The metal oxide is preferably at least one member of the group of zirconium oxide, chromic oxide and aluminum oxide. Aluminum oxide is most preferred.

The manganese oxide may be in the form of any of the oxides of manganese. The finely divided manganese oxide preferably used to make the pellet has an average diameter of less than about 1 mm. and more preferably less than about 0.07 mm.

The pellet of this invention preferably contains greater than about 50 percent by weight manganese oxide and less than about 50 percent by weight of non-reactive metal oxide. A preferred pellet composition of this invention is about 75% by weight manganese oxide and about 25 percent by weight of nonreactive metal oxide.

The hot reducing gas of this invention generally comprises hydrogen, carbon monoxide or mixtures thereof. The sulfur in the hot reducing gases is generally in the form of hydrogen sulfide with minor amounts of carbon oxysulfide and sulfur vapor. A preferred hot reducing gas composition of this invention is hydrogen, water vapor, hydrogen sulfide, carbon monoxide, carbon dioxide, carbon oxysulfide and sulfur vapor. The reducing gas commonly contains less than about six percent by volume hydrogen sulfide. A common reducing gas which is treated by the process of this invention has a composition of 70% by volume hydrogen, about 20 to 25% by volume carbon monoxide and between about 0.5 and 4% hydrogen sulfide.

The preferred oxidizing gaseous atmosphere of this invention for use in regeneration preferably comprises oxygen, carbon dioxide, water vapor, or mixtures thereof and a nonreactive carrier gas. The nonreactive carrier gas is preferably nitrogen, sulfur dioxide, or an inert gas or mixtures thereof.

The temperature of the bed of pellets during desulphurization as described above is between about 500° C. and about 1300° C. Preferably, the temperature is between about 700° C. and about 1000° C.

The bed of pellets has a temperature during regeneration of between about 500° C. and about 1300° C. and preferably has a temperature of between 850° C. and 1150° C.

The sulfur in the hot reducing gas is generally $H_2S$ since other sulfur containing gases such as sulfur dioxide are reduced to $H_2S$ under the conditions described above.

The hot reducing gas at the end of the desulfurization process has a low sulfur content approaching the value for equilibrium of the gas with manganese oxide. Preferably, the hydrogen sulfide content of the exhaust product gases is less than about 200 ppm by volume.

Preferably the bed of pellets is regenerated and reused in the process of this invention at least about six times without any significant loss of activity. In the absence of fly ash contaminants and the like there is no known limit to the amount of times the preferred sintered, porous bed of pellets comprising a reaction product of finely divided manganese and finely divided nonreactive porous metal oxide can be regenerated and reused. One bed was reused for 18 times without any substantial reduction in the reactivity of the pellets.

For economic reasons the manganese oxide used in this invention is preferably in the form of an ore such as Comilog ore which is a rich manganese ore. Manganese ore in this invention may contain minor amounts of materials such as iron oxide, silica, alumina and the like.

The following examples illustrate the processes and apparatus of this invention.

EXAMPLE 1

A schematic diagram of one embodiment of the process of this invention is shown in FIG. 1. Hot reducing gas at about 1600° F. (870° C.) from a coal gasifier (not shown) passes through line 1 into fixed bed 2. The entering gas flows at 10,000 scfm and contains 1.5 percent $H_2S$. The fixed bed 2 contains 30 tons of pellets formed from an intimate mixture of 75 percent Comilog ore and 25 percent alumina powder. The product gas, containing less than 500 ppm $H_2S$, leaves the system through line 3. It is assumed that break-through occurs at 90 percent bed saturation, corresponding to 24 hours of operation. At this time the flow of hot reducing gas to be desulfurized is switched to fixed bed 4 which is substantially identical to fixed bed 2.

While fixed bed 4 is in the desulfurization stage of the cycle, bed 1 is regenerated and reduced. In the first step of this process, the traces of reducing gas is flushed from bed 1 and vented with a small quantity of nonreactive gas such as nitrogen. This gas enters through line 5 and leaves through line 6. Then the bed is regenerated with 5000 scfm of a gas mixture containing 4.5 percent oxygen, 23.9 percent $CO_2$ and 71.6 percent $H_2O$ ($p_{H2O}/p_{CO2}=3$) which enters through line 7 at 1425° F. (774° C.). With this gas mixture the peak bed temperature during regeneration is 1922° F. (1050° C.). To complete the conversion of all sulfur species in the product gas to $SO_2$, 100 scfm of oxygen is added in the free board through line 8. The product gas, leaving through line 9, contains 4 percent $SO_2$ on a wet basis and 14 percent $SO_2$ on a dry basis. This gas is suitable to make sulfuric acid or elemental sulfur. The bed is regenerated in 18 hours. At this time the flow of oxidizing gas is stopped and the bed is again briefly flushed with a nonreactive gas, such as nitrogen.

The manganese oxide after regeneration is in the form of $Mn_3O_4$. After the bed is flushed of oxidizing gases, the oxide is reduced to MnO by a desulfurized reducing gas also entering through line 5 and vented through line 6. The flow rate of the gas is 1000 scfm and the duration of the reduction period is 75 minutes. At the end of this time the bed is ready to again be used to desulfurize hot reducing gas.

EXAMPLES 2-5

Comilog ore, a rich manganese dioxide ore, was used as the source of manganese oxide. After being heated in air at 1000° C., the ore used has a chemical analysis of 63 percent manganese (primarily as $Mn_3O_4$, 1.3 percent $SiO_2$, 4.8 percent $Al_2O_3$, and 3 percent $Fe_2O_3$. Experiments were conducted with sized, as-delivered ore, and with sintered pellets of blends of finely ground ore and alumina powder. In the latter case the ore was ground to −200 mesh (a diameter of less than about 0.07 mm.), and mixed with −65 mesh (a diameter of less than about 0.2 mm.) tabular alumina. Pellets were made of the following combinations of these materials:

(1) 100% by weight of manganese oxide ore,
(2) 75% by weight manganese oxide ore and 25% by weight alumina, and
(3) 50% by weight manganese oxide ore and 50% by weight alumina.

The material was shaped into approximately spherical pellets having a diameter of about 10 mm. and sintered in air at 1200° C. for 1 hour. In a few cases the pellets were heated at 1400° C. for 12 hours. All sintered pellets were hard and resistant to breakage.

The rates of the various reactions for small samples of sized ore and for individual sintered pellets were determined over a range of temperature from 700° to 1300° C. and a range of gas compositions. In each experiment the sample was placed in a platinum screen basket and lowered in flowing helium into the uniform temperature zone of a 1½-inch-diameter (38 mm) vertical tube furnace; the platinum suspension wire was then connected to an automatic recording balance. In order that the reduction of $Mn_3O_4$ to MnO and the conversion of MnO to MnS could be studied individually, the sample was first reduced with $H_2$ and then reacted with an $H_2S$—$H_2$ gas mixture containing from 0.9 to 3.3 percent $H_2S$. After the reaction to MnS was completed, the sample was regenerated with air or, in a few cases, with a mixture of 10% $O_2$+90% $SO_2$. After the first cycle, some samples were recycled one or more times.

The reactivity of 75 percent Comilog Ore-25 percent alumina pellets was tested in a small packed bed. The packed bed was 1½ inches in diameter and 7½ inches (19 cm) high, and contained 148 pellets weighing initially a total of 150 grams. The bed was heated in a 3-inch-diameter (7.6 cm) vertical furnace and was alternately sulfided in $H_2S$—$H_2$ gas mixtures and regenerated with air through 18 cycles. The range of furnace temperatures was from 800° to 1020° C. During the sulfiding steps the gas flows were from 1 to 4.3 liters/min and the composition was from 1.1 to 3.2 percent $H_2S$.

The $H_2S$ concentration in the exhaust gas was determined periodically in certain cycles by bubbling the gas through cadmium acetate solution, thus precipitating the sulfur as CdS. The total sulfur in the precipitate was determined by a combustion-titration technique. In the regeneration step the air flow in all cycles was 1 liter/min. The exhaust gas was analyzed periodically in certain cycles for $SO_2$. At the completion of the eighteenth cycle, several pellets were tested individually for reactivity.

Ore Granules

The rate of sulfidation of Comilog ore granules in $H_2S$—$H_2$ mixtures was found to be directly proportional to the $H_2S$ concentration over the investigated ranged from 0.9 to 3.2 percent $H_2S$. There is a very strong particle-size effect, even though the particles are small. The time for completion of the 90 percent reaction with 2 percent $H_2S$—$H_2$ increased from 19 minutes for 0.2 mm diameter particles to 100 minutes for 1.7 mm diameter. The effect of temperature on the rate of sulfidation was shown by 0.6-mm granules reacting with 2 percent $H_2S$—$H_2$ mixture. The rate increased steadily from 700° to 1100° C., with the time for 90 percent reaction decreasing from 80 to 25 minutes, respectively. The effect of temperature on the regeneration of 0.6-mm-diameter ore granules with air was shown by the time for 90 percent regeneration of the granules decreasing from 4.5 minutes at 900° C. to 2.1 minutes at 1100° C. The effect of particle size was found to be minor over the range from 0.6 mm to 1.7 mm diameter.

Sintered Pellets

The rate data for the first sulfidation and regeneration cycle at 1100° C. for a 75 percent manganese oxide ore—25 percent alumina pellet shows that the sulfidation with 3.3 percent $H_2S$—$H_2$ was 90 percent complete in 85 minutes, and the regeneration in air was 90 percent complete in 22 minutes.

The rate of sulfidation of the sintered pellets of the various blends of ground ore and alumina was found to be proportional to the concentration of $H_2S$ over the investigated range from 0.9 to 3.3 percent.

The results for the 75 percent ore pellets from 700° to 1300° C. fall into two distinct patterns. Longer reaction times were required for samples cycled 1 to 3 times, whereas shorter times were needed for the samples that had previously been through 18 cycles in the packet bed. Within the experimental scatter and the limits of the investigation, the time for 90 percent completion of reaction was independent of the reaction temperature. The 90 percent reaction time was about 60 minutes for the initial cycles and about 35 minutes for the 19th cycle. The time for the initial cycle of a pellet previously held at 1400° C. for 12 hours was 75 minutes, which is within the range of scatter.

The results for the experiments with 100 percent ore pellets at 900° to 1100° C. show that at 1000° and 1100° C. the reaction times clearly decreased within the first few cycles. The reaction time for 90 percent completion was about 200 minutes over this temperature range. The time for the initial cycle of a pellet held previously at 1400° C. for 12 hours was 1250 minutes.

The time for 90 percent completion of regeneration with air for pellets containing 75 and 100 percent manganese oxide ore shows that the reaction times again fall into separate curves for the initial and 19th cycles. The times for 90 percent regeneration of 100 percent ore pellets decreased from 70 to 30 minutes with increasing temperature from 900° to 1100° C. For the initial cycles with 75 percent ore pellets, this reaction time decreased from 27 to 13 minutes for the temperature range 900° to 1200° C. In the 19th cycles the reaction time decreased from 12 to 5 minutes with increasing temperature from 900° to 1300° C. In experiments with a 10 percent $O_2$—$SO_2$ mixture the reaction time for 90 percent regeneration at 1000° C. was 29 minutes.

Figure 2:
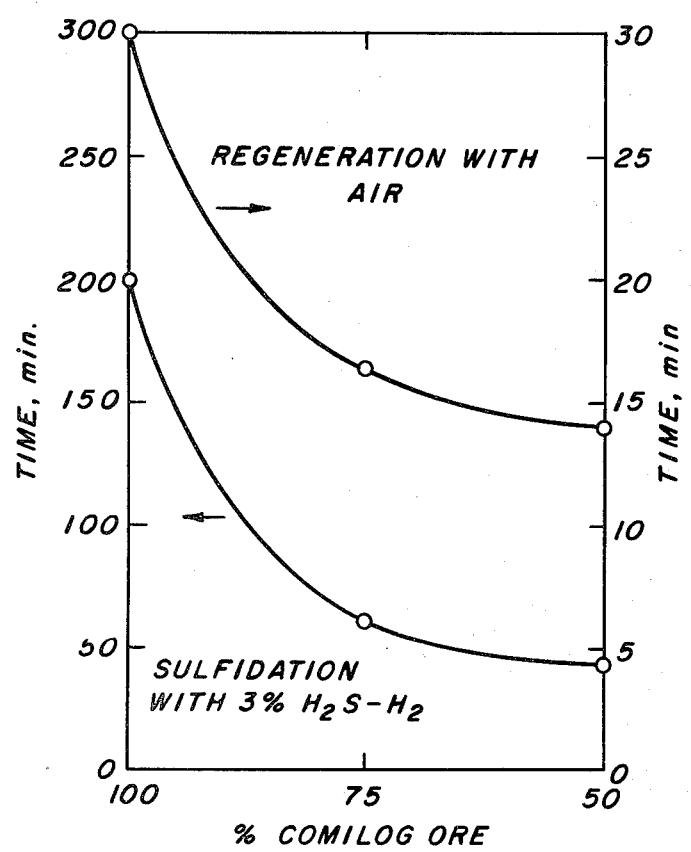

A limited number of experiments were made with 1-cm-diameter 50 percent manganese oxide ore—50 percent alumina pellets at 1100° C. The times for 90 percent completion of sulfidation and regeneration remained constant over the four-cycle experiment. From these results, and the average times for the 75 and 100 percent ore blends, the time for 90 percent completion of sulfidation and regeneration is shown as a function of pellet composition in FIG. 2. The reaction time decreases with decreasing ore content. However, the greatest decrease by far occurs when the ore content decreases from 100 to 75 percent.

Packed Bed

The packed bed containing 150 g of 75 percent ore pellets was recycled 18 times. The concentration of $H_2S$ in the exhaust gas was measured during sulfidation in cycles 2, 5, 6, 7, 8, 10, 17, and 18. The break-through curve for the final cycle is given in FIG. 3 for a furnace temperature of 1000° C. with 3.0 percent $H_2S$ flowing at 3 liters/min STP. The $H_2S$ concentration in the steady-state portion of the curve is 159 ppm. For breakthrough, defined as 500 ppm $H_2S$ in the exhaust gas, the bed was 89 percent saturated. Since the entering gas is dry, the amount of water vapor in the exhaust gas is equal to the quantity of $H_2S$ reacted. The $p_{H_2O}/p_{H_2S}$ ratio for the steady-state region is 189. The results from other cycles are listed in Table I as follows:

cycles 6, 7, 9, and 17. A single curve fits the data for furnace temperatures from 800° to 1000° C. During the early and middle stages of regeneration, elemental sulfur was seen to deposit in the exhaust lines, indicating that the oxygen in the reacting air was completely consumed. Also, the composition of the exhaust gas approached the theoretical maximum $SO_2$ concentration of 13.6 percent, which corresponds to the complete consumption of oxygen in the air. The breakthrough occurred rapidly when the bed was essentially completely regenerated.

Discussion of Results

There was a very strong particle-size effect on the reaction of the MnO in the as-delivered Comilog ore with $H_2S$ even with small particles. The ore particles are quite dense, and apparently the product layer of MnS severely retards gaseous diffusion. Particles of suitable size for packed beds react too slowly for practical bed volumes and recycling times. The pellets formed from blends of finely divided manganese oxide ore and finely divided alumina powder react much more rapidly with $H_2S$ than the as-delivered ore and, as demonstrated, have reaction rates suitable for use in a packed bed. The reaction with $H_2S$ in the packed bed was sufficiently rapid that the exhaust gas was essentially in equilibrium with the bed. During regeneration of the packed bed with air the oxygen was completely converted to $SO_2$.

EXAMPLE 6

A fixed packed bed 10 inches in diameter and 10 feet high containing 500 pounds of 9-mm-diameter manganese oxide-alumina pellets was built. The pellets were made with 75 percent finely divided Comilog Ore (a rich manganese oxide ore) and 25 percent finely divided alumina. The unit was operated in three stages. Following regeneration, the bed was reduced with reducing gas at about 880° C. for about 2 hours. Then reducing gas containing 1.5 percent $H_2S$ at 880° C. was put through the bed for desulfurization. After the steady state period, the $H_2S$ concentration moved steadily upward. In actual practice, the exhaust would, at this point, be sent also through a second bed. When the bed Table I

| | | Data from Packed-Bed Experiments for $H_2S$ Reaction | | | | | |
|---|---|---|---|---|---|---|---|
| Cycle Number | Temp, C. | Gas Flow Rate, l/min | Initial $H_2S$, % | Steady State Exhaust $H_2S$, ppm | $\frac{H_2O}{H_2S}$ | log $\frac{H_2O}{H_2S}$ | Bed Saturation at Break through, % |
| 2 | 800 | 1 | 3.14 | 49 | 625 | 2.79 | 96 |
| 5 | 800 | 1 | 2.97 | 47 | 625 | 2.79 | * |
| 6 | 800 | 3 | 1.10 | 15 | 714 | 2.85 | * |
| 7 | 800 | 3 | 2.14 | 43 | 500 | 2.70 | 86 |
| 8 | 900 | 4.2 | 2.14 | 88 | 244 | 2.39 | * |
| 10 | 1000 | 3 | 3.21 | 157 | 204 | 2.31 | 81 |
| 17 | 1020 | 3 | 3.21 | 170 | 189 | 2.28 | 76 |
| 18 | 1000 | 3 | 3.00 | 159 | 189 | 2.28 | 89 |

The packed bed was regenerated with air flowing at 1 liter/min in each cycle. A thermocouple placed in the center of the bed indicated that the bed temperature rose about 50° C. in the vicinity of the reaction zone. The actual temperature of the reacting pellets was probably higher since regeneration temperatures as low as 800° C. were used successfully without the formation of $MnSO_4$. The concentration of $SO_2$ in the exhaust gas is given in FIG. 4 as a function of regeneration time for was about 80 percent saturated, the regeneration step was started. A mixture of $H_2O$—$CO_2$—$O_2$ was flowed through the bed. The input gas temperature during regeneration was between 700 and 850° C. in these cycles so that the exhaust temperature was less than 1100° C. After a time, the $SO_2$ concentration began to drop sharply after the bed is almost completely regenerated. At this time in commercial practice, the off-gas would be sent to a second bed so that a steady $SO_2$ concentration would be maintained.

The fixed bed of pellets was subject to 11 cycles of desulfurization involving 42 days of operating time. During that time, in each recycle, the concentration of $H_2S$ in the hot reducing gas was decreased from 1.6 percent to 450 ppm (0.045%), which is suitable for reducing iron oxide pellets. Furthermore, during regeneration, the $SO_2$ concentration in the dried regeneration gas was as high as 13 percent, far in excess of the minimum level for the economical recovery as sulfuric acid or elemental sulfur.

We claim:

1. In a process for desulfurizing hot reducing gas by contacting said gas with a desulfurizing agent, then regenerating the spent desulfurizing agent, and then reusing the regenerated desulfurizing agent for desulfurizing hot reducing gas, the improvement wherein the desulfurizing agent comprises a bed of sintered porous pellets comprising more than about 50% by weight manganese oxide and less than about 50% by weight of a nonreactive porous metal oxide wherein said pellets were sintered at a temperature between about 1000° C. and about 1400° C., and wherein the spent desulfurizing agent is regenerated by contacting said bed with an oxidizing gaseous atmosphere and wherein the temperature of the bed is maintained between about 500° C. and about 1300° C. in the desulfurization step and the regeneration step.

2. Process as in claim 1 wherein said pellets have an average diameter of between about 5 and about 15 mm and wherein the pellets comprise finely divided manganese dioxide particles having an average diameter of less than about 1 mm.

3. Process as in claim 1 wherein said pellets have a compression strength of at least about 10 pounds and a porosity of at least about 10% of the volume of the pellets.

4. Process as in claim 3 wherein said metal oxide is in the form of finely divided particles and is at least one member selected from the group consisting of zirconium oxide, chromic oxide and aluminum oxide.

5. Process as in claim 3 wherein said hot reducing gas comprises hydrogen, carbon monoxide and hydrogen sulfide.

6. Process as in claim 5 wherein said hot reducing gas comprises hydrogen, water vapor, hydrogen sulfide, carbon monoxide, carbon dioxide, carbon oxysulfide and sulfur vapor.

7. Process as in claim 3 wherein said oxidizing gaseous atmosphere comprises oxygen, carbon dioxide, water vapor or mixtures thereof and a non-reactive carrier gas.

8. Process as in claim 7 wherein said carrier gas is nitrogen, sulfur dioxide, an inert gas or mixtures thereof.

9. Process as in claim 3 wherein said bed of manganese oxide pellets is a fixed or moving packed bed.

10. Process as in claim 9 wherein said packed bed has a diameter of between about 1 and about 20 feet and a height of between about 1 and about 30 feet.

11. Process as in claim 3 wherein said hot reducing gas comprises about 70% by volume hydrogen, about 20 to 25% by volume carbon monoxide, and between about 0.5 and about 4% hydrogen sulfide.

12. Process as in claim 9 wherein said hot reducing gas is at a temperature between about 700° and about 1000° C.

13. Process as in claim 1 wherein said hot reducing gas at the end of the desulfurization process has a sulfur content down to the equilibrium value of the equilibrated gas with manganese oxide for the temperature in the bed of porous pellets.

14. Process as in claim 13 wherein the hydrogen sulfide content of said hot reducing gas is reduced to less than about 200 ppm.

15. Process as in claim 3 wherein said desulfurizing agent is regenerated and reused in the process of claim 1 at least six times.

16. A process for desulfurizing hot reducing gas containing hydrogen sulfide by intimately contacting the gas with a desulfurizing agent comprising a fixed bed of sintered, pellets, said bed having a temperature between about 500° C. and about 1300° C. comprising more than about 50% by weight manganese oxide and less than about 50% by weight of a nonreactive porous metal oxide wherein said pellets were sintered at a temperature between about 1000° C. and about 1400° C., then regenerating the spent desulfurizing agent by contacting the bed with a gaseous oxidizing atmosphere of such composition and under such conditions to maintain the temperature of the bed between about 500° C. and 1300° C., then reducing the manganese oxide pellets and then reusing the regenerated, reduced desulfurizing agent under the above-mentioned conditions for desulfurizing hot reducing gas.

17. Process as in claim 16 wherein said pellets comprise a porous sintered reaction product of manganese oxide and a non-reactive, porous oxide selected from the group consisting of zirconium oxide, chromic oxide and aluminum oxide.

18. Process as in claim 17 wherein the pellets have sufficient strength to be used in the fixed bed of this process without serious deterioration and wherein the pellets have sufficient porosity to maintain good reactivity in the desulfurization and regeneration steps.

19. Process as in claim 16 wherein said pellets have an average diameter of 7 to 9 mm, wherein the said manganese oxide is MnO, wherein said oxidizing atmosphere comprises oxygen and a non-reactive carrier gas, and wherein said hot reducing gas comprises hydrogen, carbon monoxide, and hydrogen sulfide.

20. Process as in claim 19 wherein said fixed bed of pellets has an average diameter of between about 1 and about 20 feet and a height of between about 20 and about 30 feet and wherein said hot reducing gas comprises about 70% by volume hydrogen, between about 20 and about 25 percent by volume carbon monoxide, and between about 0.5 and about 4% by volume hydrogen sulfide.

21. Process as in claim 20 wherein said hydrogen sulfide in said hot reducing gas has been reduced to an amount less than about 200 ppm and wherein said desulfurizing agent is regenerated and reused for desulfurizing hot reducing gas at least six times.

22. Process as in claim 16 wherein the regenerated manganese oxide pellets are reduced to MnO in a separate step by contacting the bed of pellets with a hot reducing gas.

23. Process as in claim 16 wherein said hot reducing gas comprises hydrogen, carbon monoxide and carbon dioxide, water vapor, hydrogen sulfide and minor amounts of methane and nitrogen.

* * * * *